(12) United States Patent
Zhou et al.

(10) Patent No.: US 11,571,938 B2
(45) Date of Patent: Feb. 7, 2023

(54) JET-PROPELLED VTOL HYBRID CAR

(71) Applicants: Andrew H B Zhou, San Gabriel, CA (US); Tiger T G Zhou, Tiburon, CA (US); Dylan T X Zhou, Tiburon, CA (US)

(72) Inventors: Andrew H B Zhou, San Gabriel, CA (US); Tiger T G Zhou, Tiburon, CA (US); Dylan T X Zhou, Tiburon, CA (US)

( * ) Notice: Subject to any disclaimer, the term of this patent is extended or adjusted under 35 U.S.C. 154(b) by 610 days.

(21) Appl. No.: 15/721,934

(22) Filed: Oct. 1, 2017

(65) Prior Publication Data
US 2018/0056743 A1    Mar. 1, 2018

Related U.S. Application Data

(63) Continuation-in-part of application No. 29/572,722, filed on Jul. 29, 2016, now abandoned, and a
(Continued)

(51) Int. Cl.
*B60F 5/02* (2006.01)
*B64C 37/00* (2006.01)
(Continued)

(52) U.S. Cl.
CPC .............. *B60F 5/02* (2013.01); *B60J 5/0473* (2013.01); *B64C 3/56* (2013.01); *B64C 5/10* (2013.01); *B64C 7/00* (2013.01); *B64C 13/18* (2013.01); *B64C 29/0066* (2013.01); *B64C 37/00* (2013.01); *B64D 17/80* (2013.01); *B64D 25/10* (2013.01); *B64D 27/20* (2013.01)

(58) Field of Classification Search
CPC ........... B60F 5/02; B64C 15/02; B64C 15/14; B64C 29/0033; B64C 29/0066; B64C 35/008; B64C 37/00
See application file for complete search history.

(56) References Cited

U.S. PATENT DOCUMENTS

| | | | | |
|---|---|---|---|---|
| 3,029,042 A | * | 4/1962 | Martin | B60V 3/02 244/2 |
| 4,579,297 A | * | 4/1986 | Ayoola | B60F 3/00 244/106 |
| 4,881,700 A | * | 11/1989 | Sarh | B60F 5/02 244/2 |

(Continued)

FOREIGN PATENT DOCUMENTS

CN           108437715 A  *  8/2018

*Primary Examiner* — Joseph W Sanderson
(74) *Attorney, Agent, or Firm* — Steven A. Nielsen; www.NielsenPatents.com

(57) ABSTRACT

A hybrid VTOL jet car comprising a light weight floatable chassis adapted for carrying a payload, a retractable tail section attached to a light weight floatable chassis at the rear end adapted for stabilizing the hybrid VTOL jet car, a plurality of wheels at the bottom of the hybrid VTOL jet car, a plurality of retractable wings on the sides of light weight floatable chassis, adapted for maneuvering the hybrid VTOL jet car. Further features may include a plurality of thrust-producing engines adapted for generating the thrust required for driving the hybrid VTOL jet car on a surface as well as in the air and a plurality of parachutes attached to the hybrid VTOL jet car to safely land the hybrid VTOL jet car under emergency.

4 Claims, 25 Drawing Sheets

Related U.S. Application Data continuation-in-part of application No. 29/567,712, filed on Jun. 10, 2016, now abandoned, and a continuation-in-part of application No. 15/350,458, filed on Nov. 14, 2016, now Pat. No. 9,776,715, which is a continuation-in-part of application No. 15/345,349, filed on Nov. 7, 2016, now Pat. No. 9,652,758, which is a continuation-in-part of application No. 14/957,644, filed on Dec. 3, 2015, now Pat. No. 9,489,671, which is a continuation-in-part of application No. 14/815,988, filed on Aug. 1, 2015, now Pat. No. 9,342,829, which is a continuation-in-part of application No. 13/760,214, filed on Feb. 6, 2013, now Pat. No. 9,016,565, which is a continuation-in-part of application No. 10/677,098, filed on Sep. 30, 2003, now Pat. No. 7,702,739.

(60) Provisional application No. 60/415,546, filed on Oct. 1, 2002.

(51) Int. Cl.
| | | |
|---|---|---|
| *B64C 29/00* | (2006.01) | |
| *B64C 3/56* | (2006.01) | |
| *B64C 13/18* | (2006.01) | |
| *B64C 7/00* | (2006.01) | |
| *B64D 25/10* | (2006.01) | |
| *B64D 27/20* | (2006.01) | |
| *B60J 5/04* | (2006.01) | |
| *B64C 5/10* | (2006.01) | |
| *B64D 17/80* | (2006.01) | |

(56) References Cited

U.S. PATENT DOCUMENTS

| | | | | |
|---|---|---|---|---|
| 5,161,741 A | * | 11/1992 | Seyfang | B64C 15/02 239/265.35 |
| 5,645,250 A | * | 7/1997 | Gevers | B64C 35/008 244/101 |
| 5,666,803 A | * | 9/1997 | Windisch | B64C 29/0066 239/265.25 |
| 6,138,943 A | * | 10/2000 | Huang | B60F 5/02 244/17.25 |
| 6,517,026 B1 | * | 2/2003 | Smith | B60F 3/00 244/2 |
| 7,581,381 B2 | * | 9/2009 | Bryant | B64C 11/001 244/12.5 |
| 7,959,104 B2 | * | 6/2011 | Kuntz | A63H 17/00 244/2 |
| 8,827,200 B2 | * | 9/2014 | Radu | B60F 5/02 244/2 |
| 9,493,235 B2 | * | 11/2016 | Zhou | B60F 5/02 |
| 9,776,715 B2 | * | 10/2017 | Zhou | B64C 29/0075 |
| 2002/0125367 A1 | * | 9/2002 | Killingsworth | B60F 5/00 244/17.11 |
| 2002/0195518 A1 | * | 12/2002 | Killingsworth | B63H 7/02 244/7 A |
| 2005/0223694 A1 | * | 10/2005 | Bryant | B64C 11/001 60/228 |
| 2005/0236520 A1 | * | 10/2005 | Wukowitz | B64C 5/08 244/105 |
| 2008/0048065 A1 | * | 2/2008 | Kuntz | B64C 39/024 244/17.23 |
| 2010/0181414 A1 | * | 7/2010 | Lopez, Jr. | B64C 29/0033 244/12.4 |
| 2011/0042507 A1 | * | 2/2011 | Seiford, Sr. | B60F 5/02 244/2 |
| 2013/0068876 A1 | * | 3/2013 | Radu | B60F 5/02 244/2 |
| 2016/0114887 A1 | * | 4/2016 | Zhou | B60F 5/02 348/148 |
| 2017/0217586 A1 | * | 8/2017 | Goelet | A01G 15/00 |
| 2020/0070605 A1 | * | 3/2020 | Park | B64C 37/00 |

\* cited by examiner

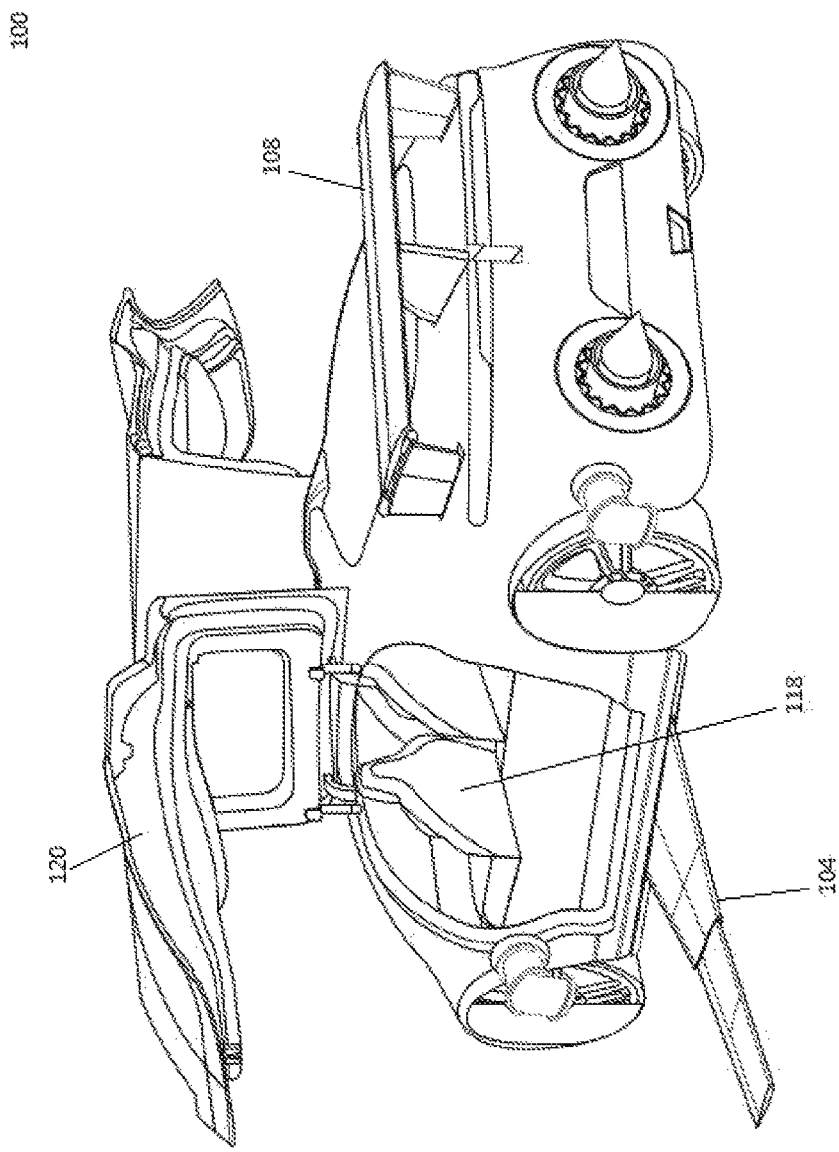

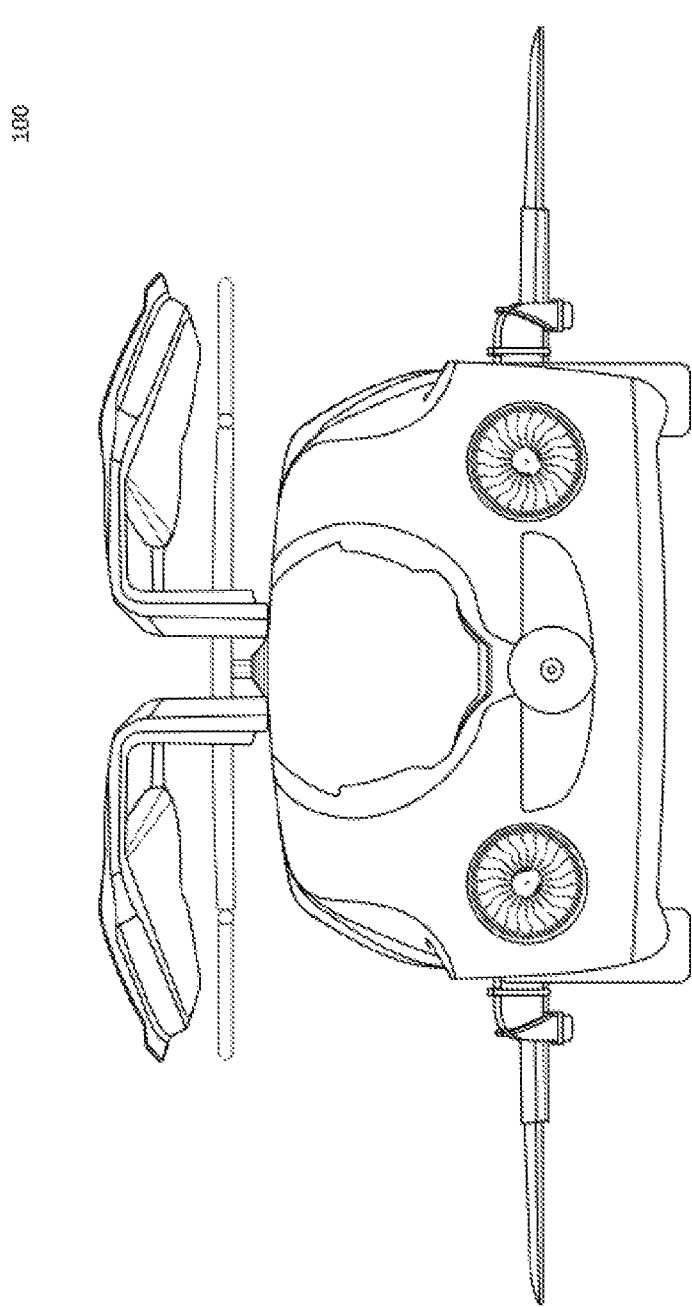

JET-PROPELLED VTOL HYBRID CAR

RELATED PATENT APPLICATIONS AND INCORPORATION BY REFERENCE

This application is a continuation-in-part of U.S. patent application Ser. No. 15/350,458, entitled "Amphibious vertical takeoff and landing (vtol) unmanned device with ai (artificial intelligence) data processing mobile and wearable applications apparatus, same as jet drone, jet flying car, private vtol jet, personal jet aircraft with gspvtol jet engines and self-jet charged and solar cells powered hybrid super jet electrical car all in one (electricity/fuel)"filed on Nov. 14, 2016, and U.S. patent application Ser. No. 29/572,722, entitled "AMPHIBIOUS VTOL, HOVER, BACKWARD, LEFTWARD, RIGHTWARD, TURBOJET, TURBOFAN, ROCKET ENGINE, RAMJET, PULSE JET, AFTERBURNER, AND SCRAMJET SINGLE/DUAL ALL IN ONE JET ENGINE (FUEL/ELECTRICITY) WITH ONBOARD SELF COMPUTER BASED AUTONOMOUS MODULE GIMBALED SWIVEL PROPULSION (GSP) SYSTEM DEVICE, SAME AS DUCTED FAN (FUEL/ELECTRICITY)", filed on Jul. 29, 2016, U.S. patent application Ser. No. 29/567,712, entitled "AMPHIBIOUS VTOL, HOVER, BACKWARD, LEFTWARD, RIGHTWARD, TURBOJET, TURBOFAN, ROCKET ENGINE, RAMJET, PULSE JET, AFTERBURNER, AND SCRAMJET ALL IN ONE JET ENGINE (FUEL/ELECTRICITY) WITH ONBOARD SELF COMPUTER BASED AUTONOMOUS GIMBALED SWIVEL PROPULSION SYSTEM DEVICE", filed on Jun. 10, 2016, U.S. patent application Ser. No. 14/940,379, entitled "AMPHIBIOUS VERTICAL TAKEOFF AND LANDING UNMANNED SYSTEM AND FLYING CAR WITH MULTIPLE AERIAL AND AQUATIC FLIGHT MODES FOR CAPTURING PANORAMIC VIRTUAL REALITY VIEWS, INTERACTIVE VIDEO AND TRANSPORTATION WITH MOBILE AND WEARABLE APPLICATION", filed on Nov. 13, 2015, and U.S. patent application Ser. No. 15/345,349, entitled "SYSTEMS AND METHODS FOR MESSAGING, CALLING, DIGITAL MULTIMEDIA CAPTURE AND PAYMENT TRANSACTIONS", filed on Nov. 7, 2016, which is continuation-in-part of U.S. patent application Ser. No. 14/957,644, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Dec. 3, 2015, which is a continuation-in-part of U.S. patent application Ser. No. 14/815,988, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Aug. 1, 2015, which claims priority to U.S. patent application Ser. No. 13/760,214, entitled "WEARABLE PERSONAL DIGITAL DEVICE FOR FACILITATING MOBILE DEVICE PAYMENTS AND PERSONAL USE", filed on Feb. 6, 2013, which is a continuation-in-part of U.S. patent application Ser. No. 10/677,098, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 30, 2003, which claims priority to Provisional Application No. 60/415,546,entitled "DATA PROCESSING SYSTEM", filed on Oct. 1, 2002, which a reincorporated herein by reference in their entirety.

FIELD OF INVENTION

The present invention relates to the field of automobiles, and more particularly to a type of device that can be converted into an automotive type vehicle capable of flying in air. The jet-propelled hybrid car is a Vertical Take-Off and Landing (VTOL) hybrid car and more specifically to a compact VTOL hybrid car with a plurality of retractable wings which can be utilized as a Personal Air Vehicle (PAV) or an Unmanned Aerial Vehicle (UAV).

BACKGROUND OF THE INVENTION

The present invention is a vehicle that contemplates no need for driving a car through traffic to and from airports. The capabilities and properties of this particular hybrid car make it compact and versatile enough so as to enable a pilot to fly this hybrid car from "door to door" without the requirement of an airport or highways particularly a runway. For example, a person could lift off as with a helicopter from a space such as a driveway, back yard, parking garage, rooftop, helipad, or airport and then fly instantly. An object of the present invention is to provide a versatile VTOL hybrid car that is not only lightweight and powerful enough to take-off and land vertically, but is also economical and powerful enough to take-off, land and fly at a fast rate of speed like an airplane. Another object of the present invention is to provide an emergency landing mechanism by utilizing parachutes equipped in the hybrid car. Therefore, it serves as a personal air vehicle (PAV) with multiple uses and configurations. The ability to transition from vertical flight to forward flight and back again provides unlimited possibilities because it combines the flexibility and best attributes of both types of aircraft.

The various flying hybrid cars presently available in the market only provides flying in air capability which needs a runway to be utilized initially while take off and cannot land on surface without the runway.

But the various available flying hybrid cars lacks in providing the VTOL mechanism and emergency landing mechanisms.

Therefore, there remains a need to overcome above mentioned problems and our invention resolve these entire problems.

SUMMARY OF THE INVENTION

In order to overcome the various problems associated with the prior art mentioned the present invention provides a flying hybrid car with emergency landing mechanisms utilizing parachutes and VTOL capability. The flying hybrid car in the present invention is capable of landing in multiple types of surfaces like water using the floatable chassis of the hybrid car.

A hybrid VTOL jet car comprises of, a light weight floatable chassis adapted for carrying a payload from once place to another, a plurality of retractable wings which are capable of folding in and out of said light weight floatable chassis based on the operation, a plurality of thrust-producing engines disposed in said light weight floatable chassis which are adapted for producing thrust, a retractable tail section adapted for stabilizing said light weight floatable chassis, a plurality of wheels wherein said plurality of wheels partially covered with a plurality of retractable wheel protectors adapted for covering said plurality of wheels while in flying mode, a thrust vectoring mechanism adapted for controlling the thrust output and an emergency safe landing mechanism for landing said hybrid VTOL jet car safely on a surface using a plurality of parachutes attached to said light weight floatable chassis.

A method for controlling a flying jet car comprising steps of lifting said jet car off of a surface using a plurality of rotatable thrust outlets to lift at least some of the weight of the jet car, wherein said plurality of rotatable thrust outlets are powered by a plurality of thrust-producing engines, pushing said jet car forward after reaching a predetermined height above said surface using said plurality of rotatable thrust outlets and landing said jet car on said surface by gradually reducing said thrust.

BRIEF DESCRIPTION OF DRAWINGS

The following drawings illustrates exemplary embodiment; however, they are helpful in illustrating objects, features and advantages of the present invention because the present invention will be more apparent from the following detailed description taken in conjunction with accompanying drawings in which:

FIG. 14 illustrates the rear left view of the given invention with emergency vehicle safe landing mechanism, seat ejection system and the emergency human safe landing mechanism according to an embodiment of the invention.

FIG. 15 illustrates the front view of the given invention with emergency vehicle safe landing mechanism and emergency human safe landing mechanism according to an embodiment of the invention.

Figure 1:
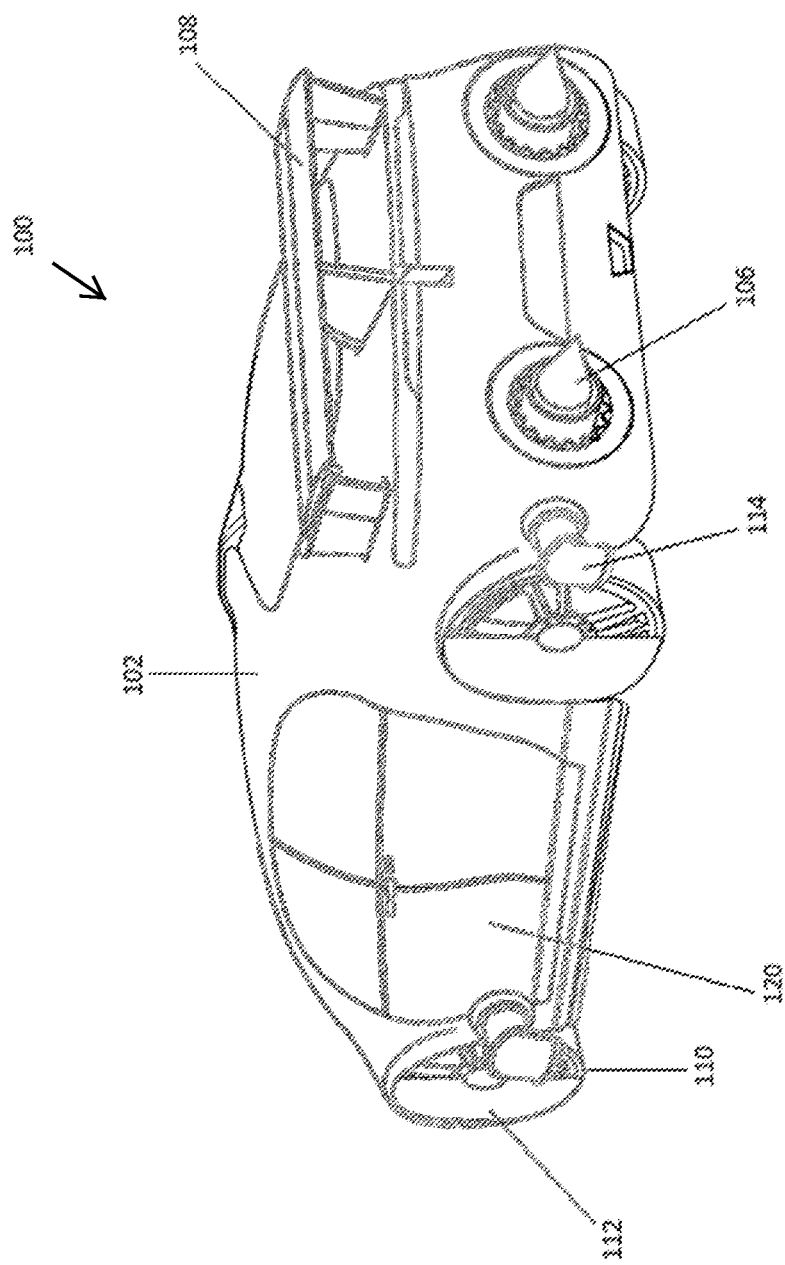
FIG. 1 illustrates the rear left view of the given invention according to an embodiment of the invention.
Figure 2:
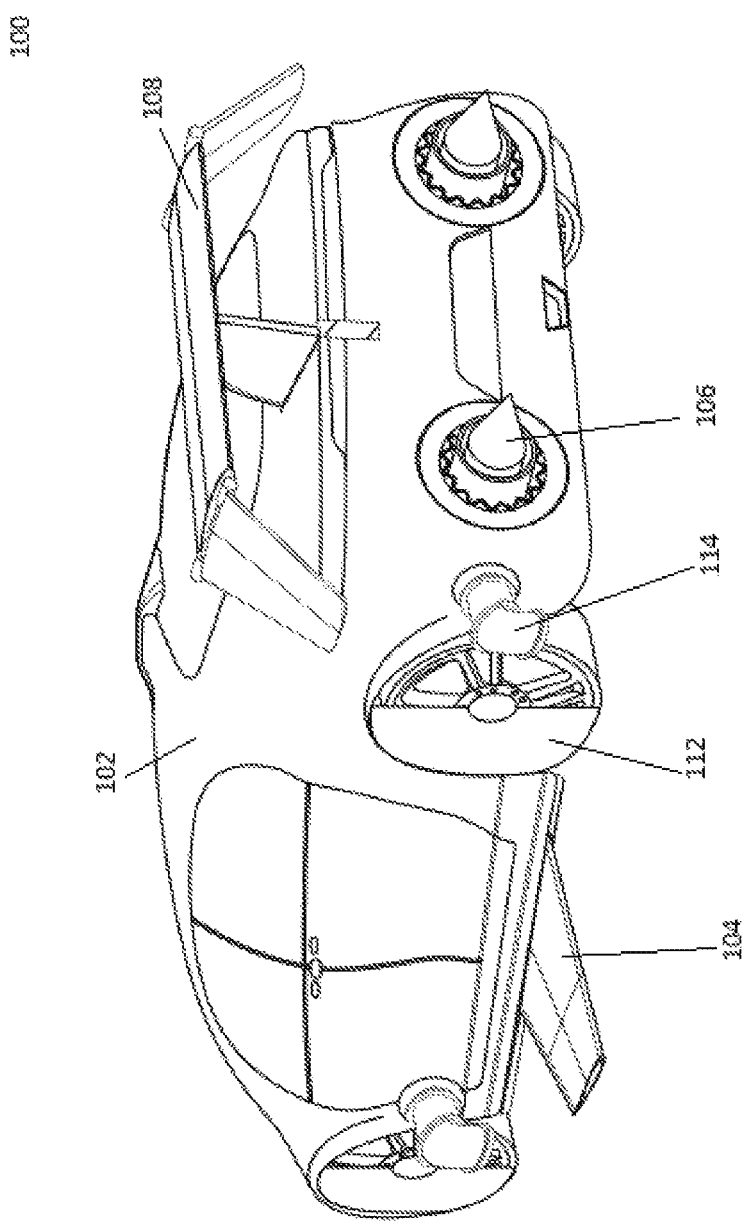
FIG. 2 depicts a perspective view of a disclosed embodiment.
Figure 3:
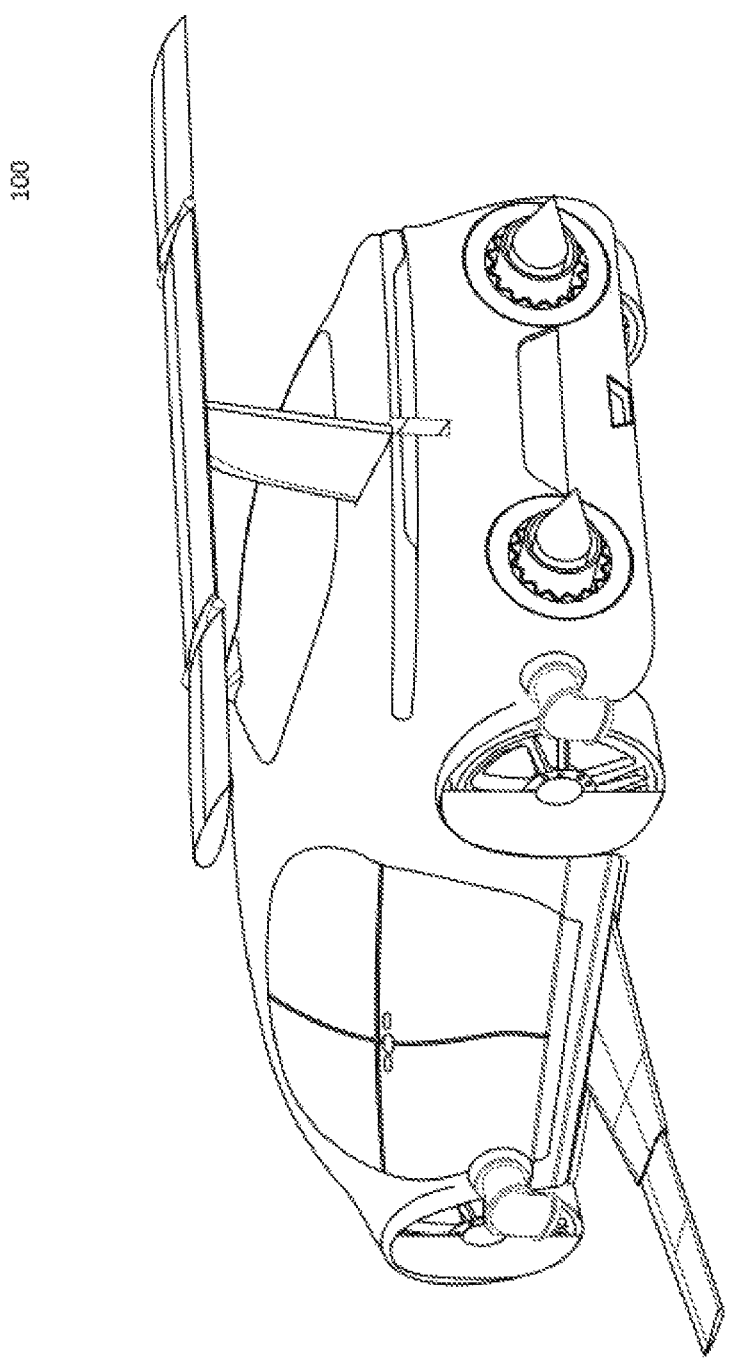
FIG. 3 illustrates the rear left view of the given invention with open retractable wings and with retractable tail according to the embodiments of the invention.
Figure 4:
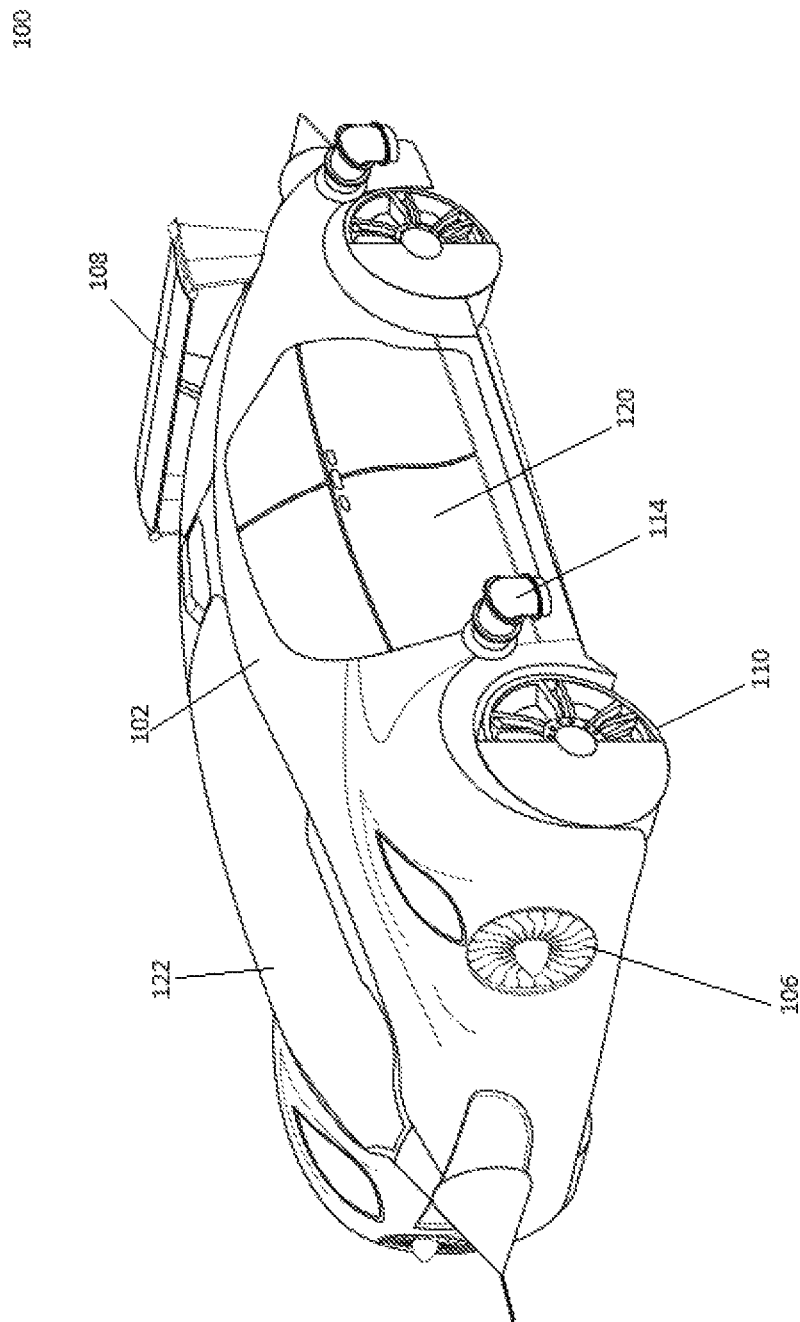
FIG. 4 illustrates the rear right view of the given invention according to the embodiments of the invention.
Figure 5:
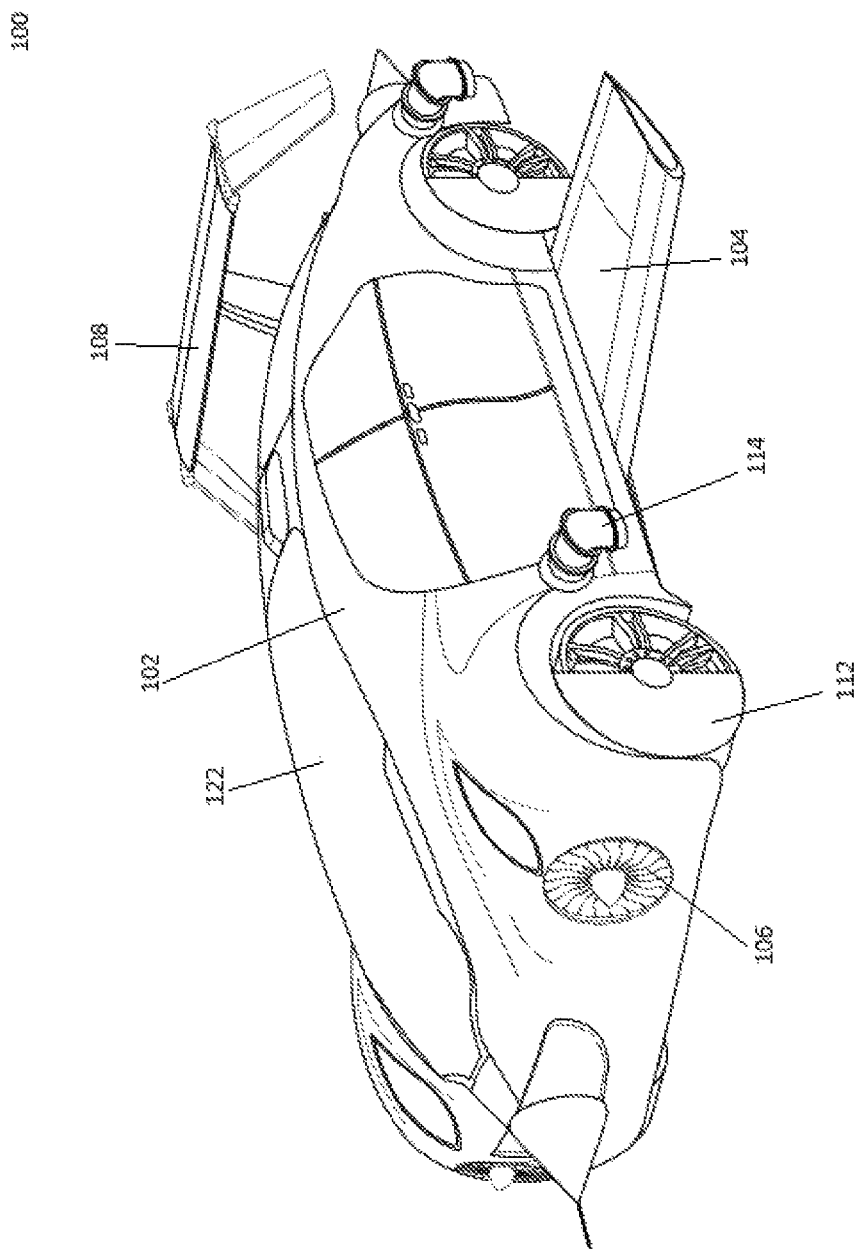
FIG. 5 illustrates the front left view of the given invention showing the movement of retractable wings and retractable tail according to the embodiments of the invention.
Figure 6:
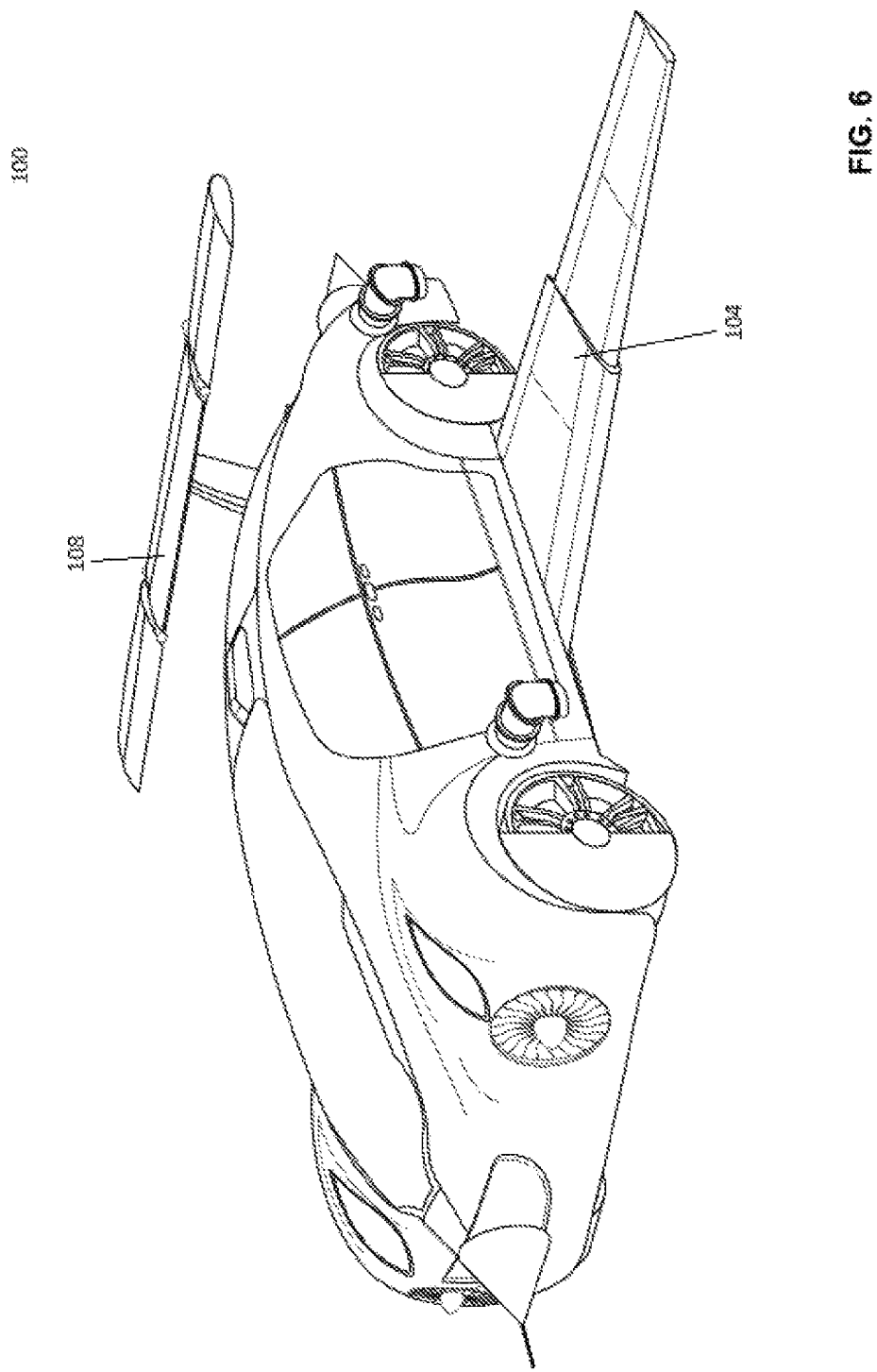
FIG. 6 illustrates the front left view of the given invention with open retractable wings and with retractable tail according to the embodiments of the invention.

REFERENCE NUMERALS IN THE DRAWINGS 100 the hybrid VTOL Jet Car
102 a light weight floatable chassis
104 a plurality of retractable wings attached to the light weight floatable chassis 102
106 a plurality of thrust-producing engines attached to the light weight floatable chassis 102
108 a retractable tail attached to the light weight floatable chassis 102
110 a plurality of wheels
112 a plurality of retractable wheel protectors for covering the plurality of wheels 110 in flight mode
114 a plurality of thrust outlets attached to the light weight floatable chassis 102
116 a plurality of parachutes attached to the light weight floatable chassis 102
118 a plurality of seats and seat ejection system for emergency vehicle landing
120 a plurality of doors attached to the light weight floatable chassis 102
122 a plurality of windshields attached to the light weight floatable chassis 102

DETAIL DESCRIPTION OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

All illustrations of the drawings are for the purpose of describing selected versions of the present invention and are not intended to limit the scope of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

References to "one embodiment," "at least one embodiment(s)," "an embodiment," "one example," "an example," "for example," and so on indicate that the embodiment(s) or example(s) may include a feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

The present invention relates to a hybrid VTOL jet car 100, enabled for vertically takeoff and land using controllable thrust produced through plurality of thrust producing engines 106. The hybrid VTOL jet car 100 comprises of an emergency safe landing mechanism which ejects the plurality of parachutes attached to the light weight floatable chassis 102 for landing the hybrid VTOL jet car 100 safely.

Figure 7:
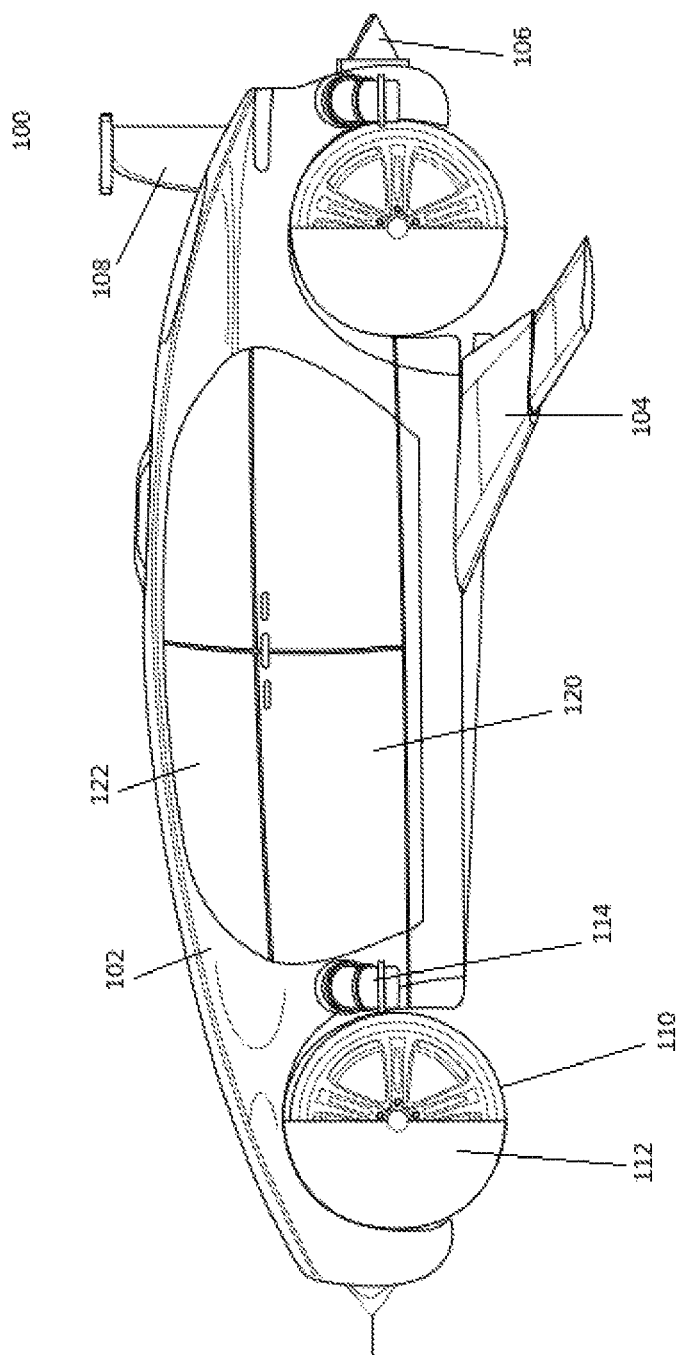
FIG. 7 illustrates the left side view of the given invention according to an embodiment of the invention.
Figure 8:
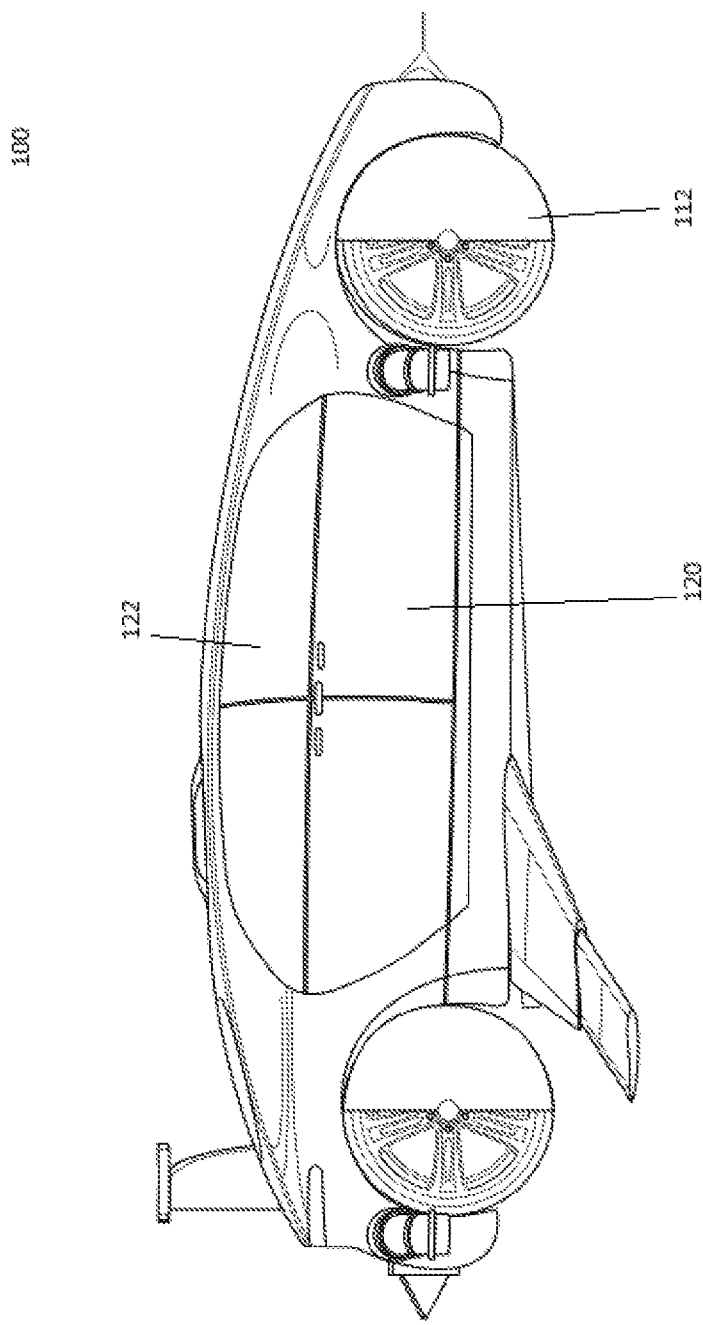
FIG. 8 illustrates the right side view of the given invention according to an embodiment of the invention.

FIG. 7 illustrates the side view of the given invention according to an embodiment of the invention which further illustrates a hybrid VTOL jet car 100 with the plurality retractable wings 104 being retracted and the plurality of rotatable thrust outlets 114 being pushing the thrust towards a direction. The retractable tail section 108 is being partly retracted and the doors of the hybrid VTOL jet car 100 being closed.

Figure 9:
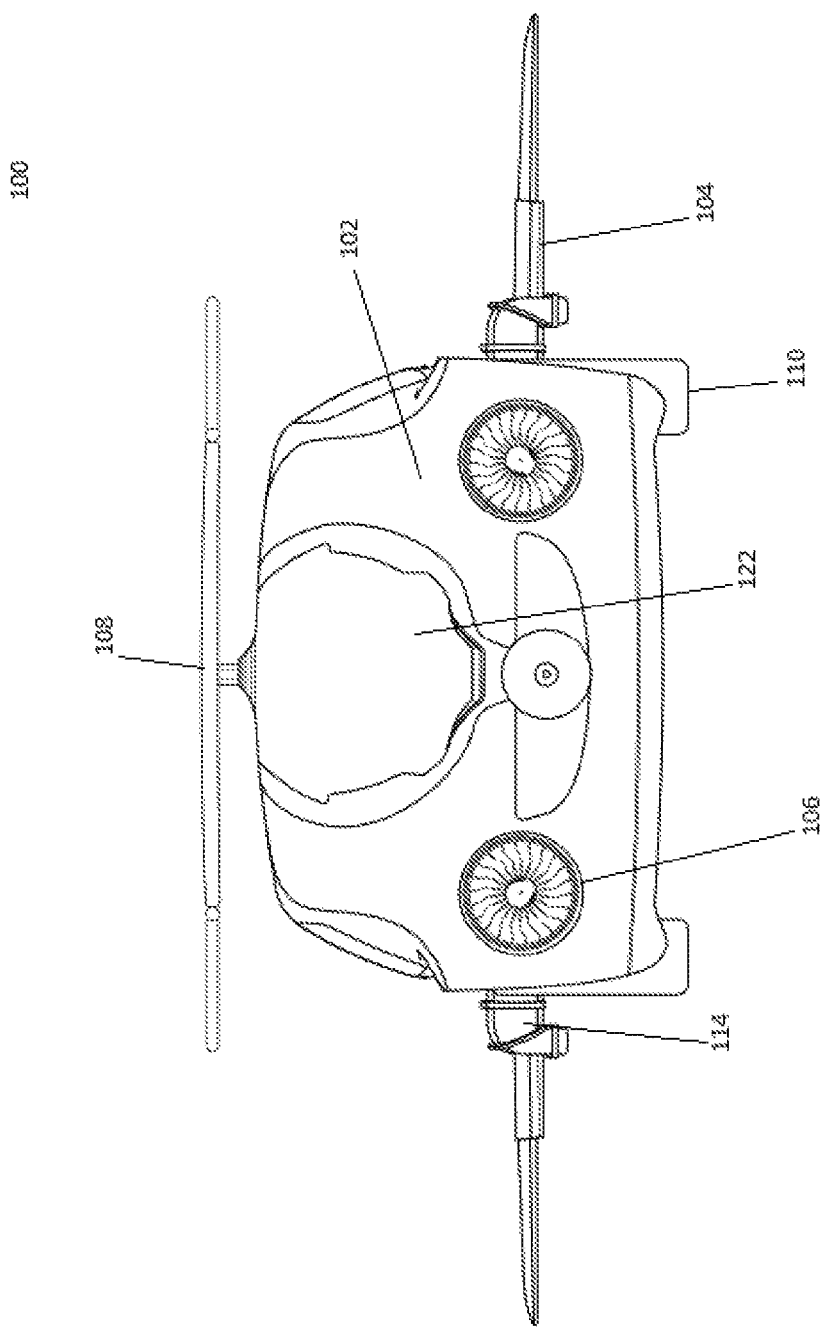
FIG. 9 illustrates the front view of the given invention according to an embodiment of the invention.

FIG. 9 illustrates the front view of the given invention according to an embodiment of the invention which further illustrates the hybrid VTOL jet car 100 having the retractable tail section 108 being retracted fully and the thrust vectoring mechanism pushing the thrust against the surface using the plurality of rotatable thrust outlets 114 being rotated towards the surface. The FIG. 9 also represents the plurality of thrust-producing engines 106 being used for generating the thrust.

Figure 10:
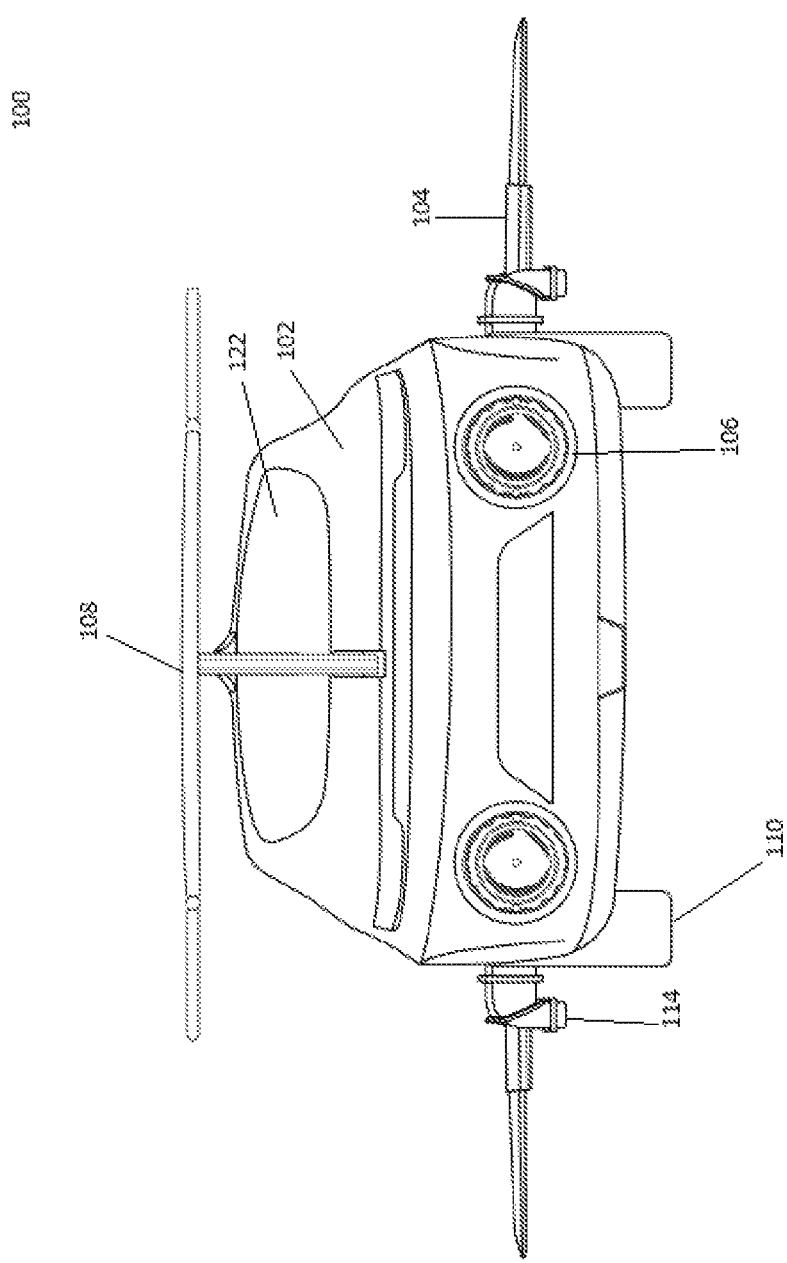
FIG. 10 illustrates the rear view of the given invention according to an embodiment of the invention.

FIG. 10 illustrates the rear view of the given invention according to an embodiment of the invention which further illustrates the hybrid VTOL jet car 100 having the retractable tail section 108 being retracted fully and the thrust vectoring mechanism pushing the thrust against the surface using the plurality of rotatable thrust outlets 114 being rotated towards the surface.

Figure 11:
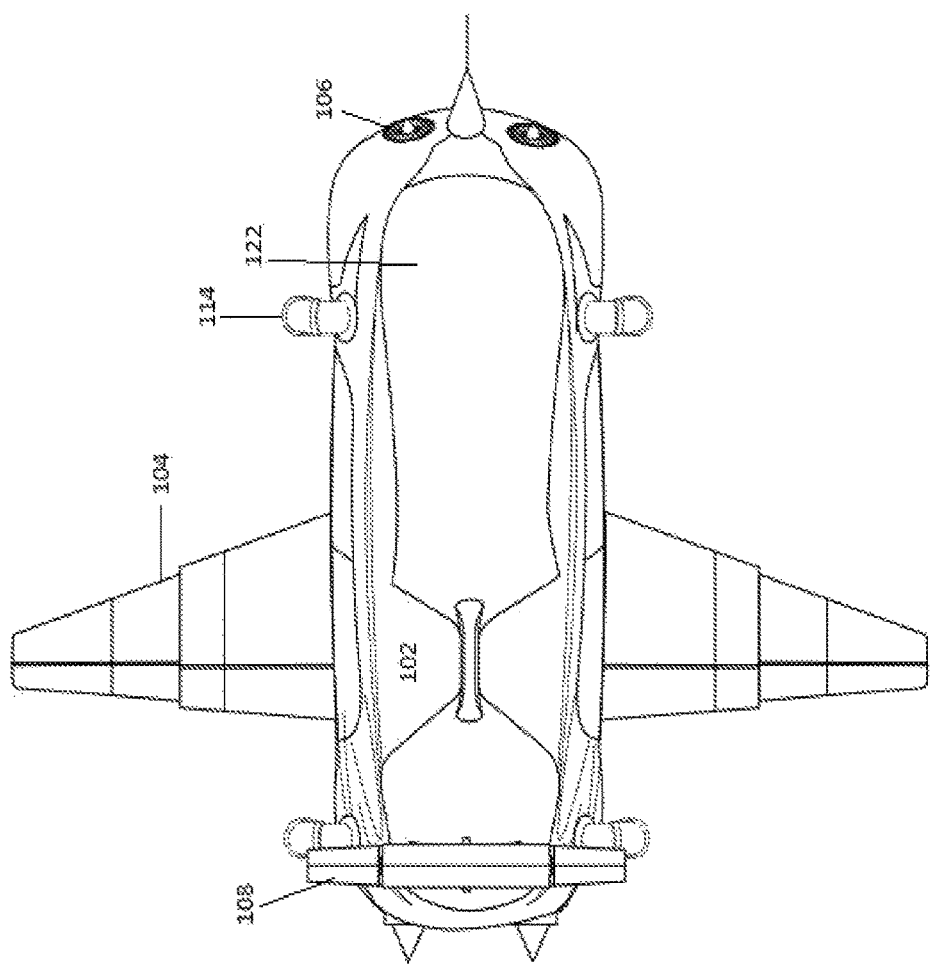
FIG. 11 illustrates the top view of the given invention according to an embodiment of the invention.

FIG. 11 illustrates the top view of the given invention according to an embodiment of the invention which further illustrates the hybrid VTOL jet car 100 having the plurality of retractable wings 104 being fully retracted for controlling the hybrid VTOL jet car 100 in the air.

Figure 12:
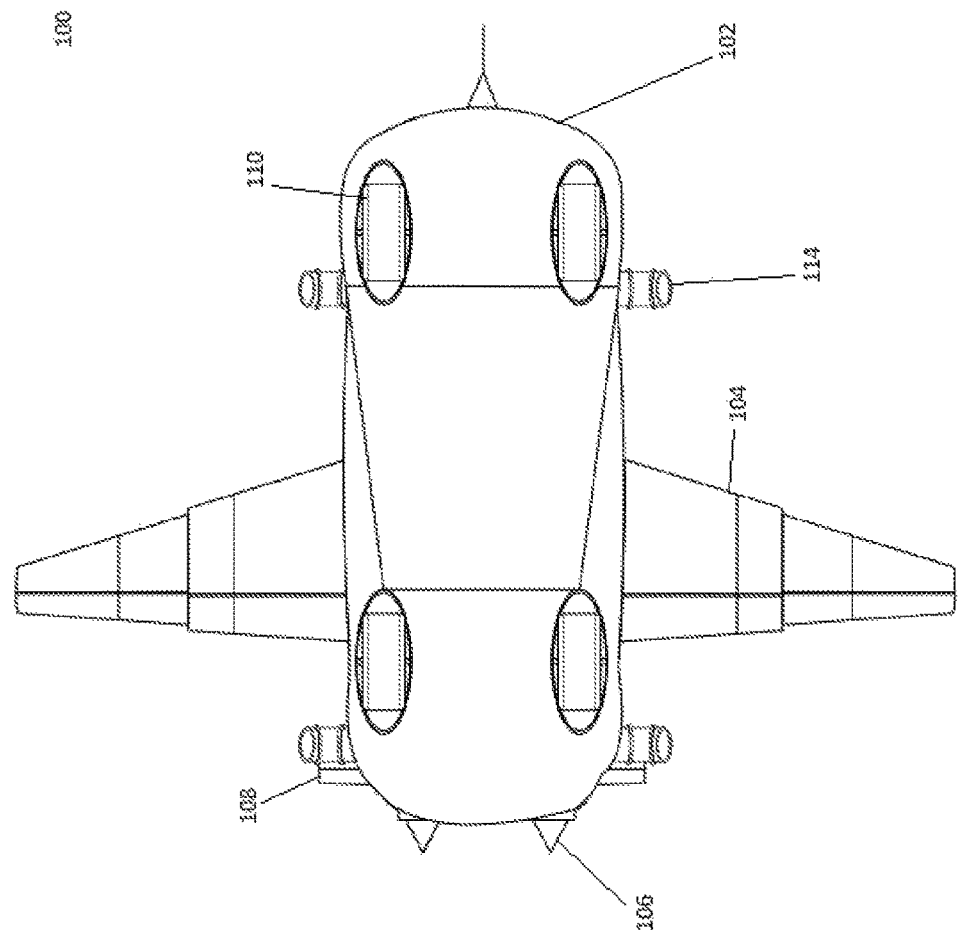
FIG. 12 illustrates the bottom view of the given invention with open retractable wings and with folded retractable tail according to an embodiment of the invention.

FIG. 12 illustrates the bottom view of the given invention according to an embodiment of the invention which further illustrates the hybrid VTOL jet car 100 having the plurality of wheels 110 being partially closed by the plurality of retractable wheel protectors 112 while in motion for maintaining the stability of the hybrid VTOL jet car 100.

Furthermore the hybrid VTOL jet car 100 has a thrust vectoring mechanism, to control the direction of the thrust generated by a plurality of thrust-producing engines 106. The trust vectoring mechanism is used to control the direction of the thrust of the hybrid VTOL jet car 100, the thrust vectoring mechanism consists of plurality of rotatable thrust outlets 114 through which the direction of the thrust is changed relative to the center of gravity of the hybrid VTOL jet car 100.

The thrust vectoring mechanism of the hybrid VTOL jet car 100 further comprises plurality of bearing swivel module mechanism, wherein the bearing swivel module controls the thrust direction of the hybrid VTOL jet car 100, the bearing swivel module controls adapted to move the hybrid VTOL jet car 100 in all the directions by changing the front bearing swivel module controls and by changing the rear bearing swivel module controls.

Figure 13A:
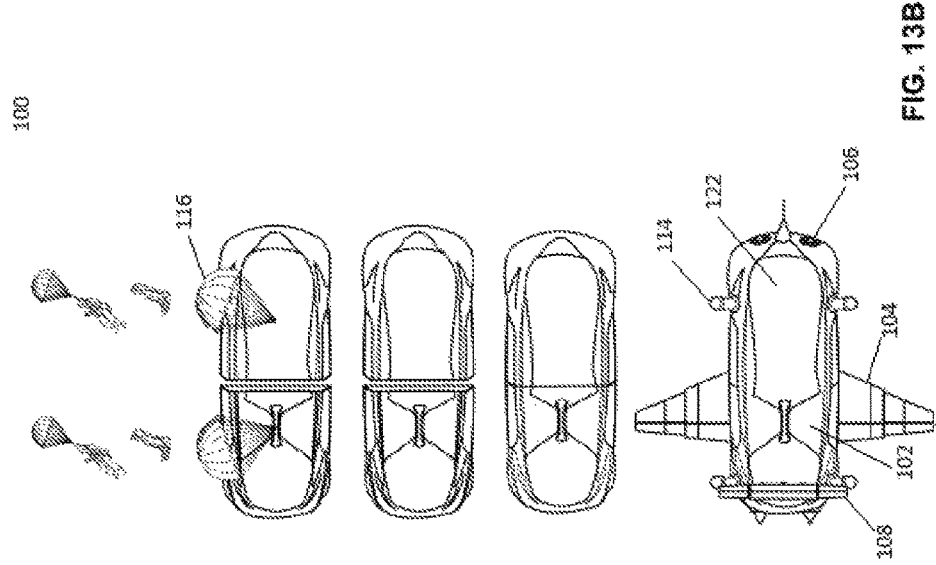
FIGS. 13A and 13B illustrates the side view and top view respectively of the emergency vehicle safe landing mechanism and the emergency human safe landing mechanism of the given invention according to an embodiment of the invention.
Figure 13B:
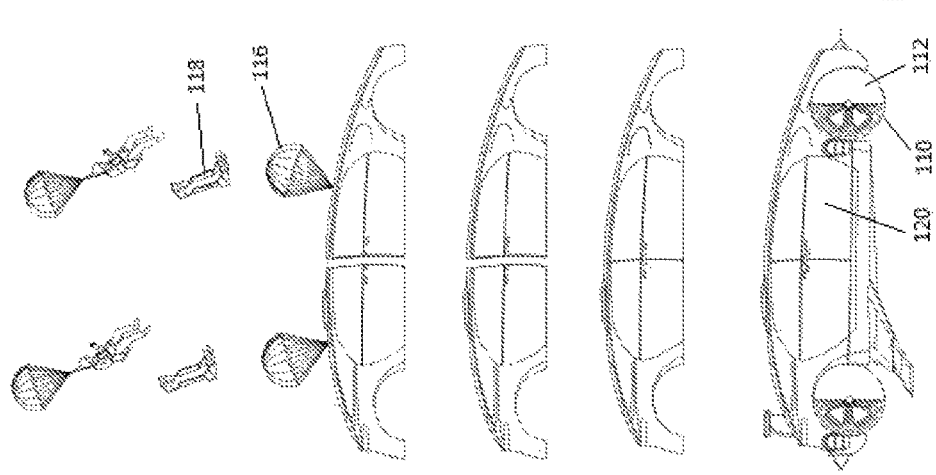
Figure 16:
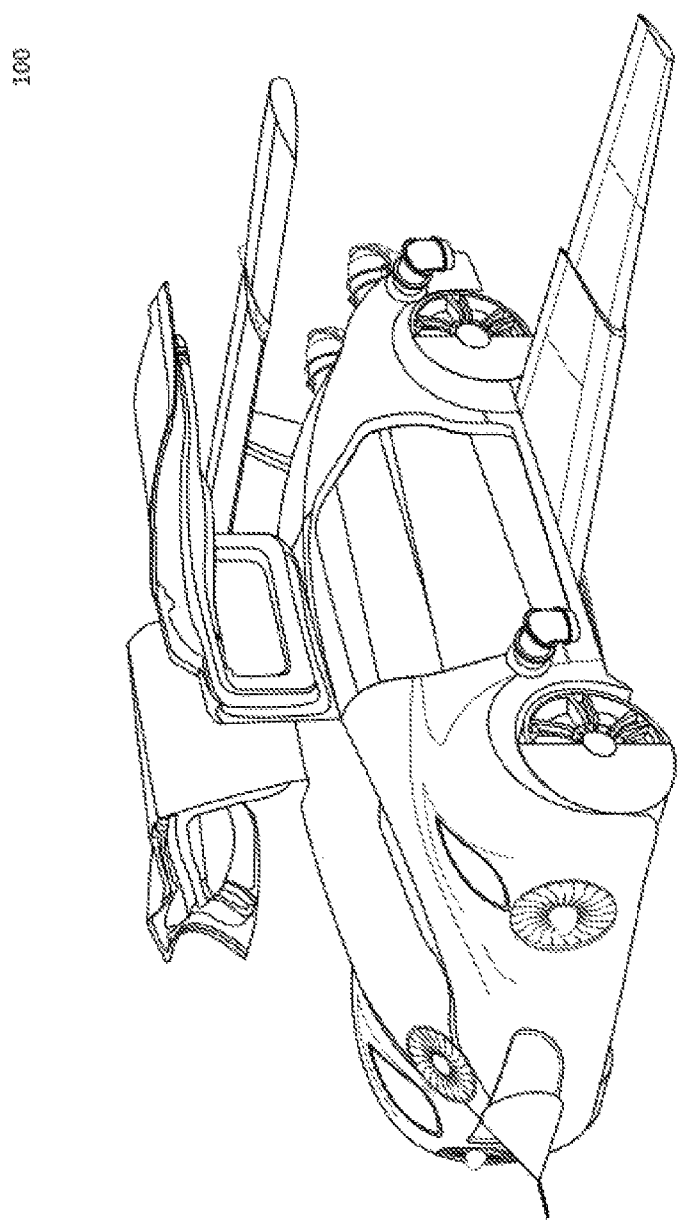
FIG. 16 illustrates the front left view of the given invention with emergency vehicle safe landing mechanism and emergency human safe landing mechanism according to an embodiment of the invention.
Figure 17:
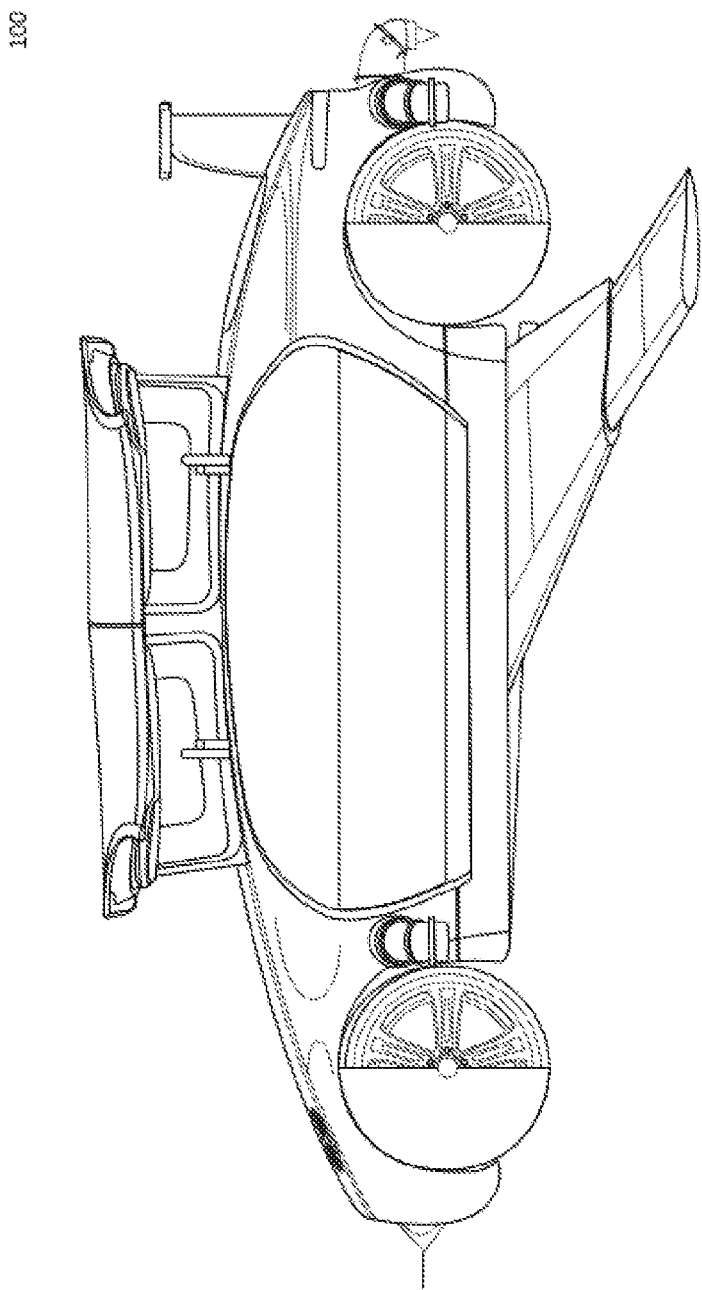
FIG. 17 illustrates the left side view of the given invention with emergency vehicle safe landing mechanism and the emergency human safe landing mechanism according to an embodiment of the invention.
Figure 18:
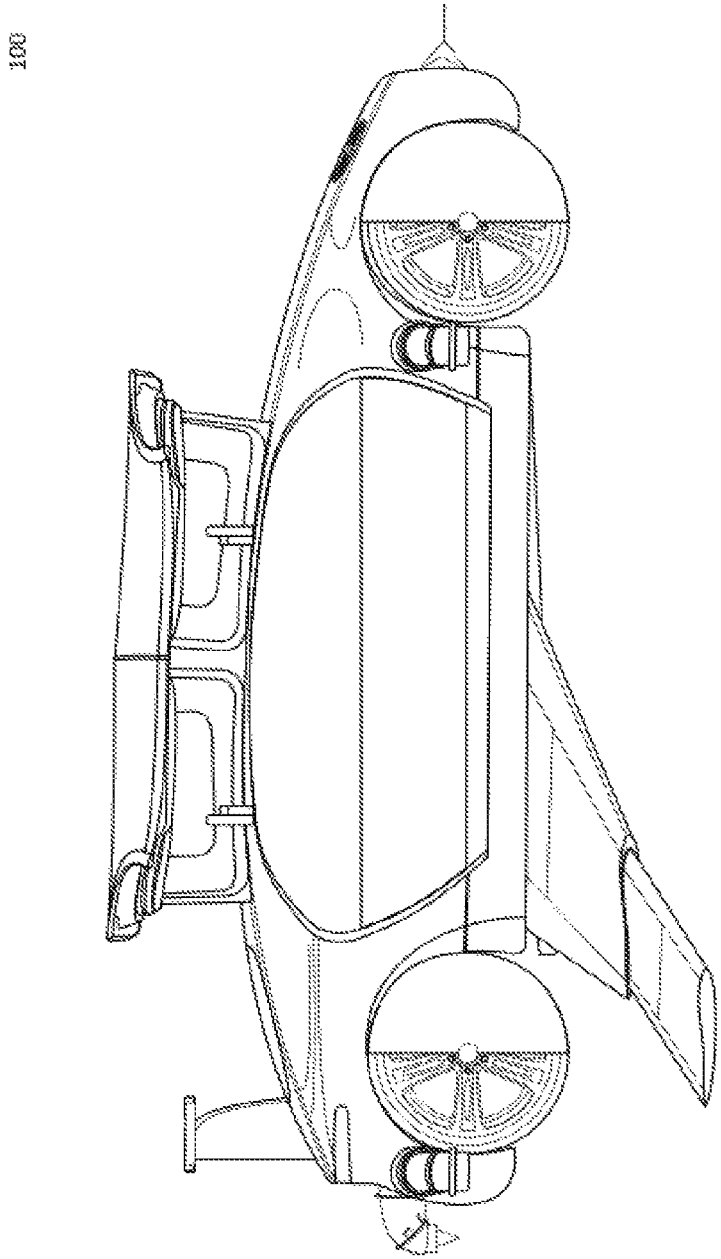
FIG. 18 illustrates the right side view of the given invention with emergency vehicle safe landing mechanism and the emergency human safe landing mechanism according to an embodiment of the invention.
Figure 19:
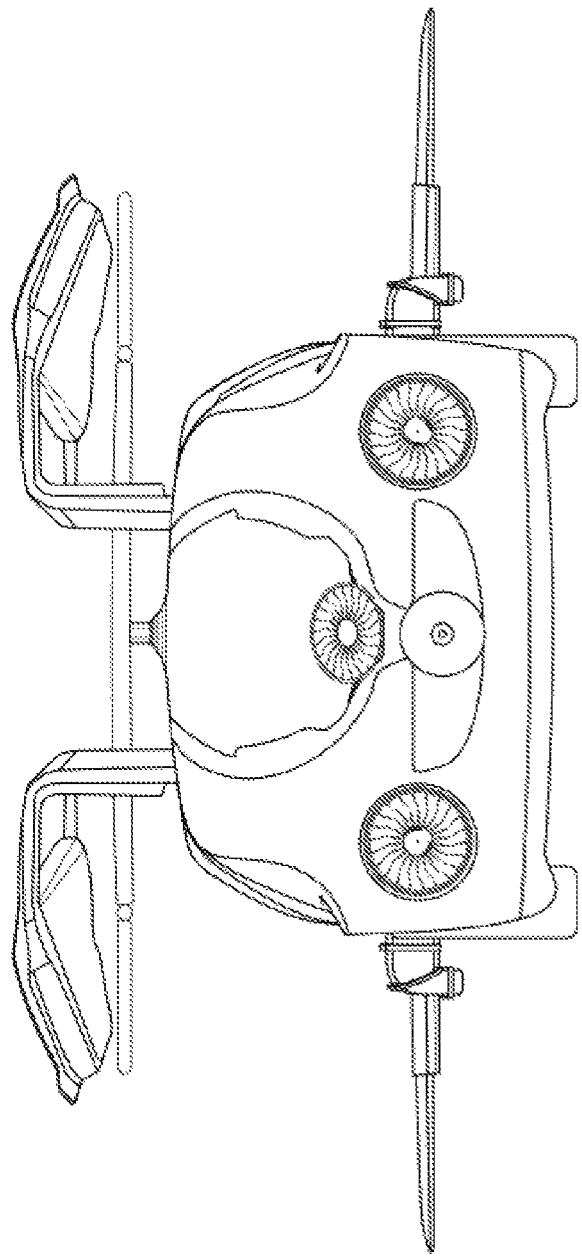
FIG. 19 illustrates the front view of the given invention with emergency vehicle safe landing mechanism, the emergency human safe landing mechanism and plurality of thrust engines according to an embodiment of the invention.
Figure 20:
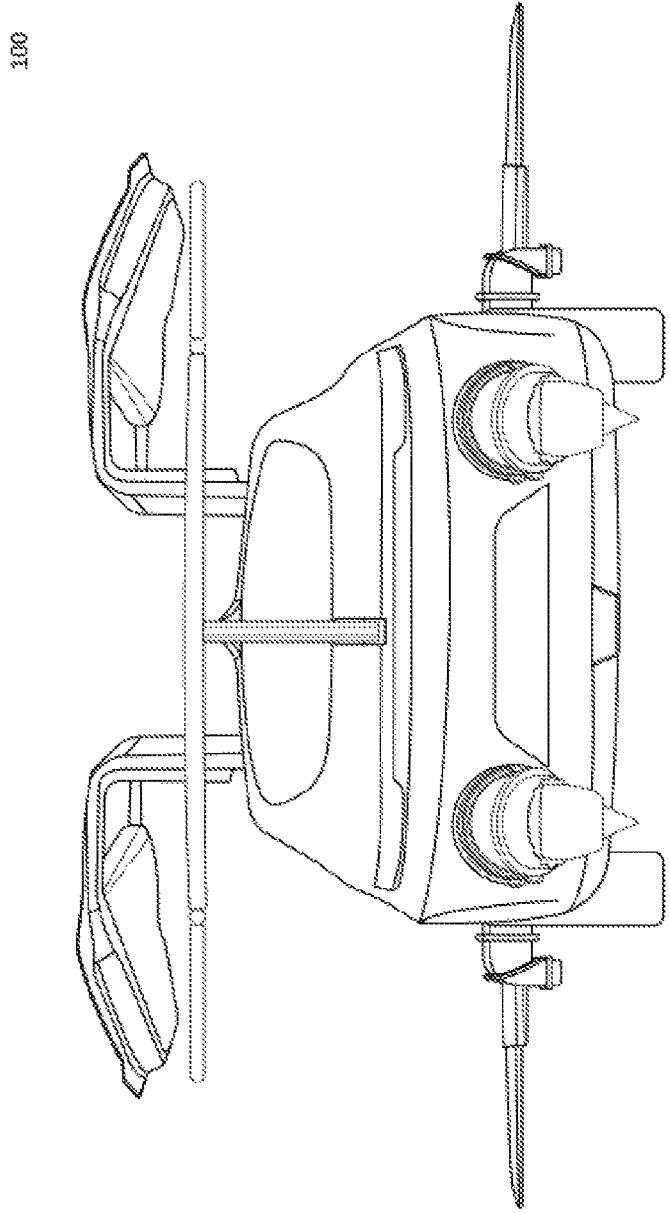
FIG. 20 illustrates the rear view of the given invention with emergency vehicle safe landing mechanism, the emergency human safe landing mechanism and plurality of thrust engines according to an embodiment of the invention.
Figure 21:
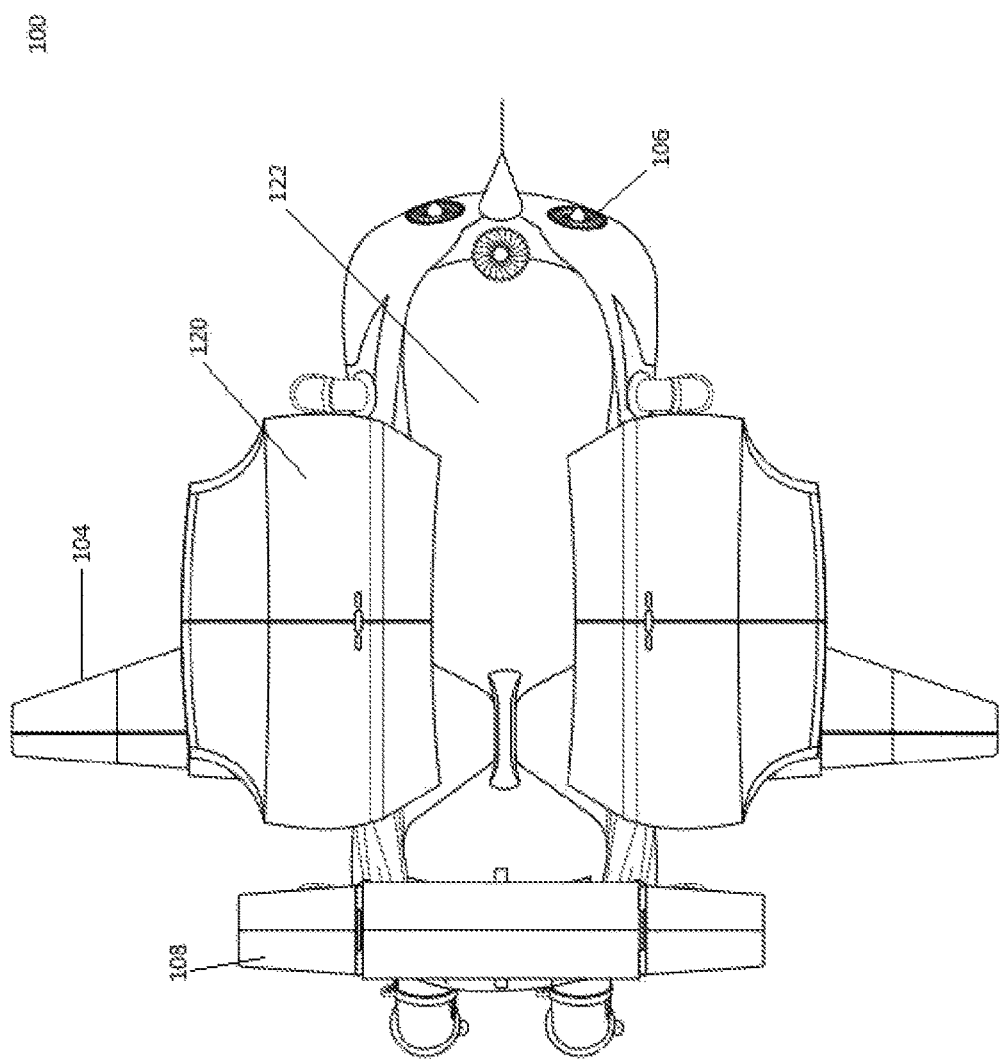
FIG. 21 illustrates the top view of the given invention with emergency vehicle safe landing mechanism, the emergency human safe landing mechanism and plurality of thrust engines according to an embodiment of the invention.
Figure 22:
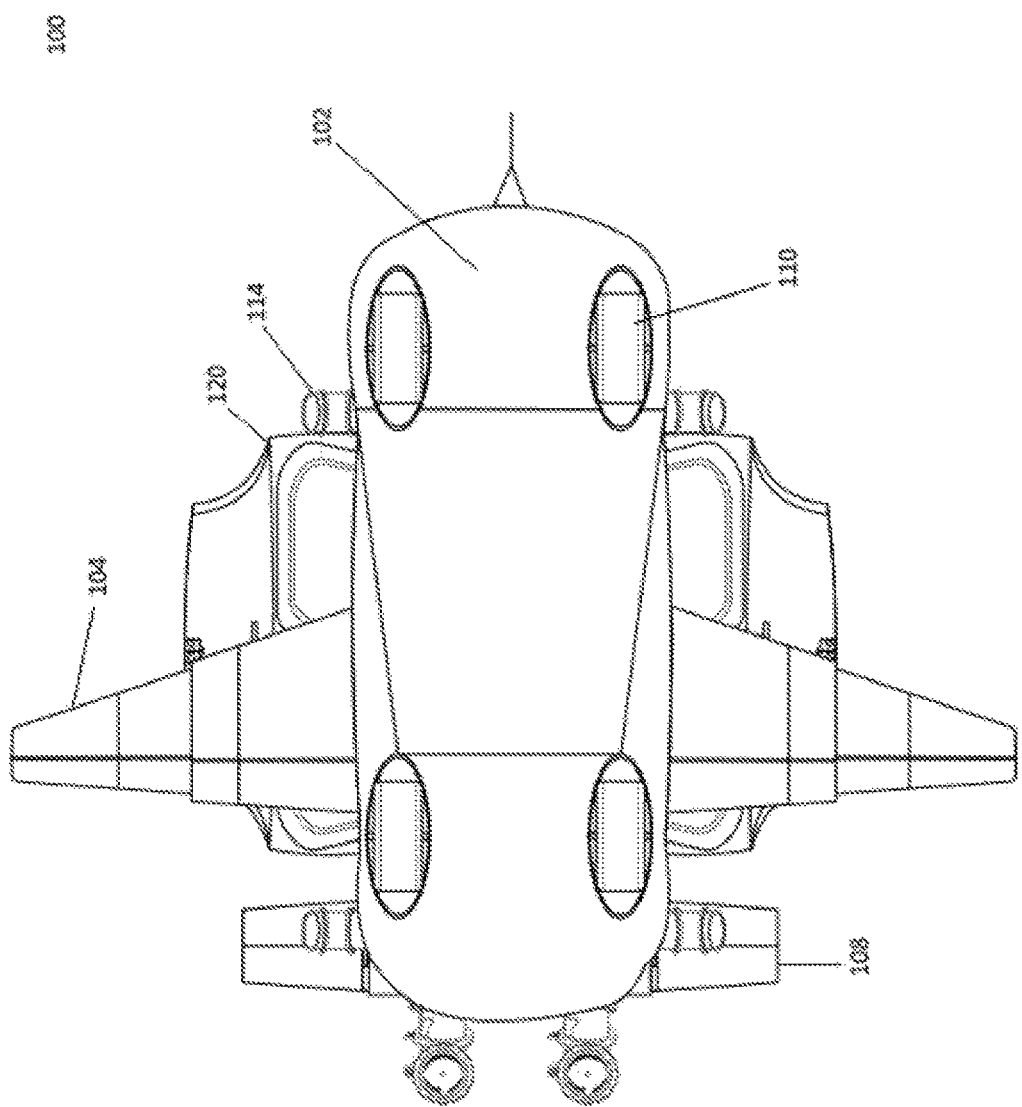
FIG. 22 illustrates the bottom view of the given invention with emergency vehicle safe landing mechanism, the emergency human safe landing mechanism and plurality of thrust engines according to an embodiment of the invention.
Figure 23:
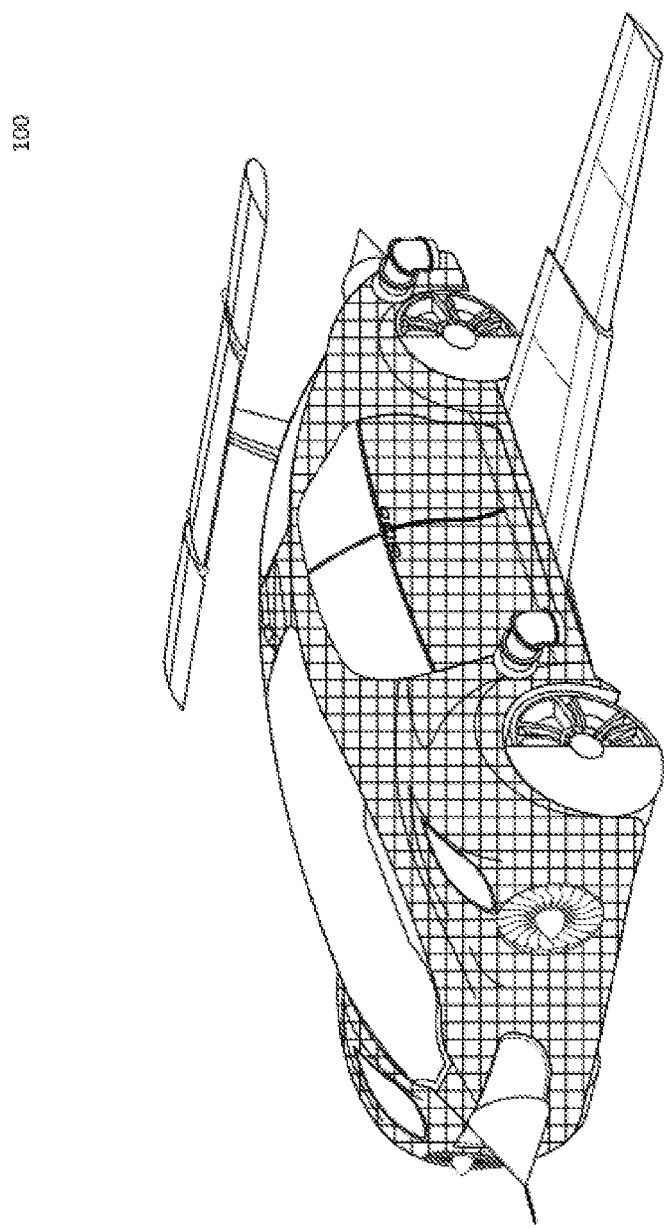
FIG. 23 illustrates an alternative front left view of the given invention with highlighted windshields attached to the light weight floatable chassis.
Figure 24:
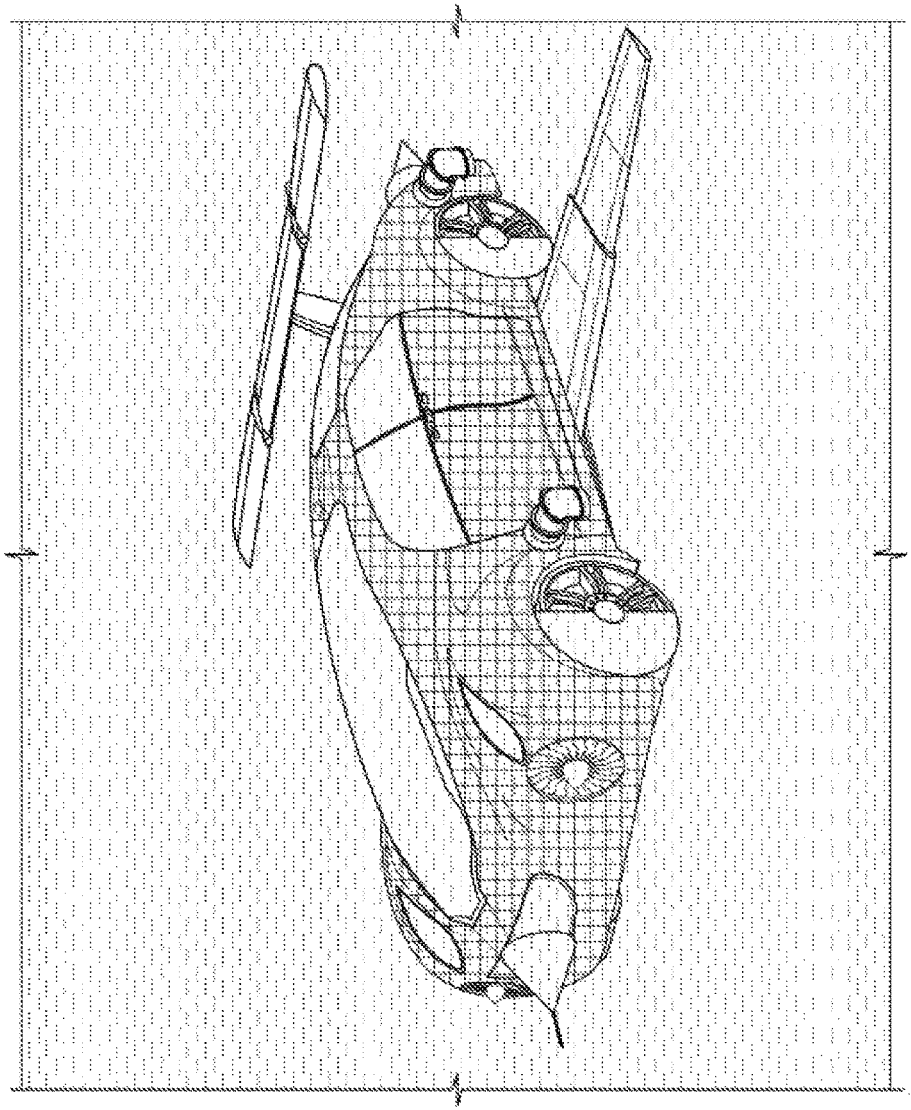
FIG. 24 illustrates the front left flight mode view of the given invention with highlighted windshields attached to the light weight floatable chassis.

FIG. 13A illustrates the side view of the emergency vehicle and human safe landing mechanism wherein the hybrid VTOL jet car 100 being controlled by the plurality of parachutes 116 attached to the light weight floatable chassis 102 activated in emergency. The plurality of parachutes 116 gradually reduces the speed of the hybrid VTOL jet car 100 while falling from sky during emergency. The emergency human safe landing mechanism of the hybrid VTOL jet car 100 adapted for ejecting the plurality of seats 118 having the plurality of parachutes 116 attached to them help the human by landing the human safely by gradually reducing the force of impact in emergency situation.

FIG. 13A illustrates the top view of the emergency vehicle and human safe landing mechanism wherein the hybrid VTOL jet car 100 being controlled by the plurality of parachutes 116 attached to the light weight floatable chassis 102 of the hybrid VTOL jet car 100.

Figure 25:
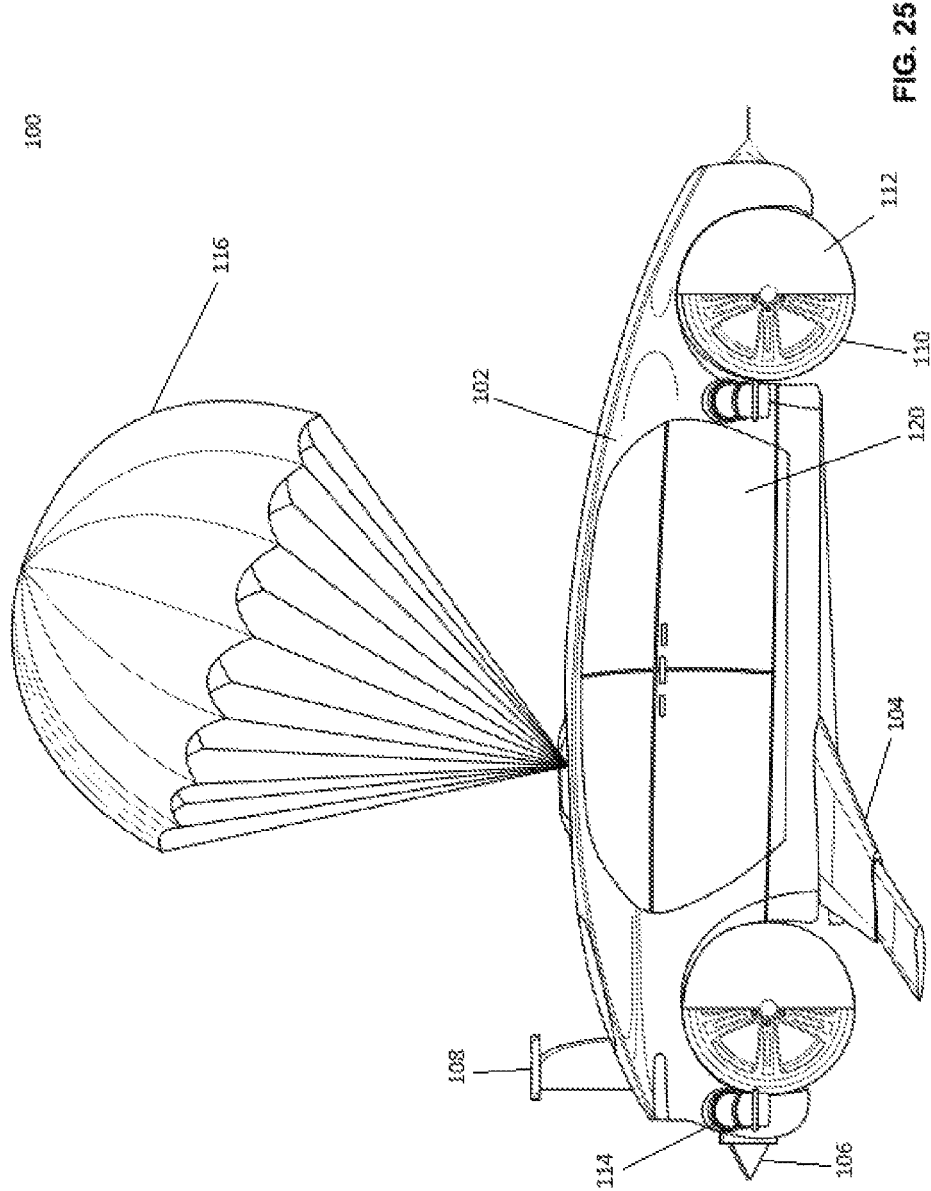
FIG. 25 illustrates the isometric view of the hybrid VTOL jet car 100 with at least one parachute among the plurality of parachutes 116 of the given invention according to an embodiment of the invention.

A plurality of parachutes 116 attached to the hybrid VTOL jet car 100 to safe land the hybrid VTOL jet car 100 under emergency situations, wherein at least one among the Plurality of parachutes 116 is fixed at the bottom of the light weight floatable chassis 102, at least two among the plurality of parachutes 116 on front and back of the flying jet car 100. The plurality of parachutes 116 is a drogue type parachute, the drogue parachute adapted to use for rapidly moving object in order to slow the object. FIG. 25 illustrates the isometric view of the hybrid VTOL jet car 100 with at least one parachute among the plurality of parachutes 116 of the given invention according to an embodiment of the invention.

The plurality of parachutes 116 are being activated in emergency conditions for stabilizing the hybrid VTOL jet car and the thrust vectoring mechanism adjusts the thrust output in order to stabilize the hybrid VTOL jet car using the plurality of rotatable thrust outlets 114.

Apart from the aforesaid features, the hybrid VTOL jet car 100 also consists of a cockpit adapted for displaying the flight conditions on a display. Further the hybrid VTOL jet car 100 has a stability system having a plurality of inputs, including that of a pilot, and a plurality of actuating outputs, wherein one of the actuating outputs is to control the angular pitch tilt jet, with the change in pitch of the tilt jet varying the vertical thrust provided by each of the plurality of thrust-producing engines 106, wherein the stabilizer arrangement includes canards.

Description of Thrust Vectoring

The invention employs thrust vectoring in several new ways. Thrust vectoring is used for two primary functions: 1) providing primary control of the aircraft attitude and trajectory; and 2) managing the rotational moments generated following one or more engine failures. The particular method of thrust vectoring incorporates additional functions: A) closure of pitch thrust "paddles" to close the engine exhaust duct when that engine is not running in flight, creating a leeward stagnation point; B) opening and modulation of pitch thrust paddle position to generate aerodynamic forces whether the engine is on or off; C) partial closure of pitch thrust paddles to distribute flow across the exhaust exit area to reduce or eliminate the base drag that would otherwise result from the open areas where no jet exhaust would normally flow.

In an embodiment, the thrust vectoring mechanism on the plurality of thrust-producing engines 106 consists of a yaw thrust vector nozzle mounted downstream of the plurality of thrust-producing engines 106. The yaw thrust vector nozzle redirects thrust from the plurality of thrust-producing engines 106 as the nozzle rotates relative to the vertical axis ("z axis") of the aircraft and to the flow of jet exhaust. The nozzle may move in more than one axes, but in a preferred embodiment pivots about yaw nozzle pivot. This provides the ability to generate side force along the y-axis of the aircraft, which can be used to stabilize the aircraft in yaw (about the z-axis) in both horizontal and vertical flight. An actuator may be used to move the nozzle about the pivot (one pivot preferably on each side of the nozzle).

Description of Engine Fairing

The thrust required to maintain conventional wing-borne flight is a fraction of the thrust required for VTOL operation. In the preferred embodiment, of the engines available, only two engines are required to cruise at the best-range airspeed, and only one engine is required to cruise at the maximum-endurance airspeed. Unfortunately the typical jet turbine engine is very inefficient at low thrust settings: the fuel burn rate at low throttle settings is still a large fraction of the fuel burn rate at the maximum throttle setting. Therefore, operating the extra engines at a lower power setting (perhaps a setting that exactly offsets the ram drag created by operating the engine) burns fuel too quickly; enough to dramatically reduce the maximum range of the aircraft. Turning the engines off is no help because the ram drag in the non-operating condition is a large fraction of the ram drag when the engine is operating.

Description of Liftstand and Landing Wheels

When a craft has landed on the tail of the aircraft, the craft is locked into a vertical position. A major problem that has prevented tail-sitting aircraft from being adopted more universally is the inability to taxi the craft safely and efficiently while in the vertical position. The present invention solves this problem by converting the aircraft from the tail-sitting position, to the conventional tricycle landing gear position, and vice-versa, using a liftstand. The liftstand is hinged at the back of the aircraft and extends well forward of the center of gravity of the aircraft at the ground contact point. The liftstand is extended using a scissor link or other suitable means that may be actuated manually or by any number of means including electrical, pneumatic, or hydraulic.

In an embodiment the emergency parachute with its deployment rocket launchers is stored in a storage location compartment in the rear fuselage, just behind the passenger cabin/canopy and above the rear engine. The parachute cables are attached to the aircraft at four attachment points (three not shown). Two of these points are located on each side of the aircraft with two fore and two aft. The front parachute cable on each side is routed from the attachment point on the front of the aircraft, up the side between the front and rear canopy, across the top between the hinged gull wing doors and back to the parachute storage compartment. The rear attachment point is located behind and above the air intake scoop on each side of the aircraft. The rear cable on each side is routed up the side of the aircraft from the attachment point to the storage compartment. All the routings are concealed in a recessed channel under a non protruding breakaway covering (not shown) which is aerodynamically flush with the fuselage.

In an embodiment, with the VTOL aircraft of the invention constituted as described above, when making vertical takeoff, the operator allows the tilt engines to be directed so that the thrust thereof directs toward the ground and selects the start mode by the changeover switch in the pilot input. Then the core engine fuel supply nozzle openings adjusting valve is adjusted, fuel is supplied from the integral fuel tank located in the intermediate wing parts of the wings to the fan engines via the core engines and fuel supply pipes, and the core engines are started. When the turbines of the core engines rotate and high-pressure air is produced by the compressor, the high-pressure air is supplied to the fan engines via high-pressure ducts. The fan engine breed air supply nozzle openings adjusting valve and the fan engine fuel supply nozzle openings adjusting valve are adjusted, fuel is burned in the combustors of the fan engines, and the turbines are rotated to rotate the rotating blades via the reduction gears to reach an idling state.

As described above, all of the tilt fan engines are used in hovering and also in cruising, so there is no unused engine as in the case of the conventional VTOL, in which fans for hovering and those for cruising are perfectly separate and when hovering the weight of the fans for cruising become excess and useless weight and when cruising the weight of the fans for hovering are excess and useless weight. Therefore, with the VTOL aircraft according to the invention, the diameter of the fan engine of the tilt fan engine can be reduced, and the aircraft can make a gliding landing with the attitude even if any of the fans is damaged and vertical takeoff is impossible.

The case of the operation mode proceeding to change successively from starting mode through hovering mode to cruise mode has been explained above, but it is possible to proceed from starting mode directly to cruise mode. In this case, assumed altitude, direction, and speed in level flight, with lift force acting on the wings, are inputted through the multi-functional display. The mode is switched to cruise mode while pushing the automatic takeoff and landing button, and then the operation proceeds automatically while undergoing the processes described above.

In an embodiment, when the mode is switched from cruise mode to hovering mode while maintaining altitude and cruising direction, a signal is sent to the outer ring rotary actuator to tilt gradually the support rings of the tilt fan engines so that the thrust directs downward, and thus hovering in position is realized. Further, when assumed landing point is inputted through the multi-functional display and the mode is switched from cruise mode to starting mode while pushing the automatic takeoff and landing button, switching from cruise mode to hovering mode, landing at the assumed landing point, and switching to starting mode are automatically performed.

In an embodiment of the VTOL aircraft according to the present invention, the fan engine of each tilt fan engine is possible to be rotated in the direction of pitching and rolling by means of the support ring and hinges, so that the thrust force from each tilt fan engine can theoretically be directed in all directions and the aircraft can move back-and-forth and side-to-side, and turn even in a hovering state, without tilting the airframe and thus increased maneuverability is attained.

The emergency parachute is deployed by the pilot via an emergency hand lever if the aircraft is in forward flight, or it is automatically deployed by a computer if an engine loses power or the aircraft becomes unstable in hover. The parachute system deploys the rockets, shooting them out at an angle and pulling the ends of the parafoil parachute in opposite directions, thereby moving the parachute away from the aircraft appendages and stretching the canopy to the full length of the parachute.

If the aircraft is moving in forward flight, computer controlled air sensors determine if a need exists to apply or delay deployment of the airbag expander of the air canopy. This would minimize the shock from the forward air speed. When the parachute is opened, it can be steered via controls inside the aircraft. The parafoil parachute gives the aircraft a forward motion to help steer the craft to a safe area for a landing while descending under the parachute. If one engine is still operating, the parachute can act as a parasail to help keep the aircraft aloft while the pilot leaves a dangerous area and searches for a safe landing site.

In an embodiment, the light weight floatable chassis 102 is separated into multiple parts with at least one among the plurality of parachutes 116 attached with the multiple parts of the light weight floatable chassis 102. In emergency situation all the plurality of parachutes 116 being released and each part of the light weight floatable chassis 102 is being landed safely using the plurality of parachutes 116 independently.

The embodiments described above are some examples of the current invention. Various modifications, applications and changes of the current invention will be apparent to those skilled in the art. The scope of the invention is defined by the claims, and is not limited to the specific examples described.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims. It is therefore to be understood that the present invention is not limited to the sole embodiment described above, but encompasses any and all embodiments within the scope of the following claims.

While various embodiments have been shown and described, it will be understood that there is no intent to limit the invention by such disclosure, but rather, it is intended to cover all modifications and alternate constructions falling within the scope of the invention, as defined in the appended claims.

What is claimed is:

1. A hybrid VTOL jet car, comprising:
    a) a chassis adapted for carrying a payload from once place to another;
    b) a plurality of retractable wings;
    c) a plurality of VTOL thrust-producing turbo fan engines disposed in said chassis;
    d) a retractable tail section adapted for stabilizing said chassis;
    e) a plurality of wheels, said plurality of wheels partially covered with a plurality of wheel protectors;
    f) a thrust controlling mechanism, said thrust controlling mechanism further comprises a plurality of rotatable thrust outlets;
    g) a plurality of electronic systems, adapted for controlling said hybrid VTOL jet car; and
    h) an emergency human safe landing mechanism, said emergency vehicle safe landing mechanism further comprises of at least one parachute attached to at least one seat.

2. The hybrid VTOL jet car of claim 1, wherein said at least one parachute attached to said at least one seat is releasably activated when said at least one seat is ejected during emergency.

3. The hybrid VTOL jet car of claim 1, wherein said payload can be a human, a container or any combination thereof.

4. The hybrid VTOL jet car of claim 1, wherein said hybrid VTOL jet car further comprises a driveshaft connected to said plurality of VTOL thrust-producing turbo fan engines.

* * * * *